United States Patent [19]
Blount

[11] Patent Number: 5,089,559
[45] Date of Patent: Feb. 18, 1992

[54] FIRE-RETARDANT ORGANIC-PHOSPHORUS SALTS

[76] Inventor: David H. Blount, 6728 Del Cerro Blvd., San Diego, Calif. 92120

[21] Appl. No.: 609,637

[22] Filed: Nov. 6, 1990

Related U.S. Application Data

[63] Continuation-in-part of Ser. No. 309,236, Feb. 13, 1989, Pat. No. 5,002,690, and Ser. No. 360,152, Jun. 1, 1989, Pat. No. 5,010,113.

[51] Int. Cl.$^5$ .................. C08F 8/40; C08L 85/02; C08F 85/04
[52] U.S. Cl. .................. 525/107; 525/123; 525/134; 525/165; 525/177; 525/187; 525/190; 525/326.1; 525/327.3; 525/327.6; 525/332.1; 525/437; 525/418; 525/452; 525/480; 525/509; 525/538
[58] Field of Search .......... 525/107, 123, 134, 165, 525/177, 187, 190, 326.1, 327.3, 327.6, 332.1, 437, 418, 452, 480, 509, 538

[56] References Cited

U.S. PATENT DOCUMENTS

| | | | |
|---|---|---|---|
| Re. 31,340 | 8/1983 | Blount | 524/650 |
| 3,248,229 | 4/1966 | Pader et al. | 252/352 |
| 3,737,426 | 6/1973 | Throckmorton et al. | 252/352 |
| 4,282,129 | 8/1981 | Blount | 521/122 |
| 4,296,211 | 10/1981 | Blount | 521/154 |
| 4,325,859 | 4/1982 | Blount | 521/122 |
| 4,376,178 | 3/1983 | Blount | 525/58 |
| 4,529,742 | 7/1985 | von Bonin et al. | 521/107 |
| 4,737,525 | 4/1988 | Blount | 521/122 |
| 4,743,624 | 5/1988 | Blount | 521/106 |
| 4,778,844 | 10/1988 | Blount | 524/706 |
| 4,904,411 | 2/1990 | Novich et al. | 264/212 |
| 4,999,383 | 3/1991 | Blount | 521/906 |
| 5,002,690 | 3/1991 | Blount | 252/182.14 |
| 5,010,113 | 4/1991 | Blount | 521/906 |

*Primary Examiner*—Morton Foelak
*Assistant Examiner*—Rabon Sergent

[57] ABSTRACT

Fire retardant salts of organic-phosphorus acid compounds are produced by mixing and reacting an organic compound with an acidic salt-forming phosphorus compound to produce an organic-phosphorus acidic compound which is then reacted with a salt-forming basic compound. These fire retardant compounds are mixed with plastics to produce fire retardant plastics.

9 Claims, No Drawings

FIRE-RETARDANT ORGANIC-PHOSPHORUS SALTS

CROSS-REFERENCE TO RELATED APPLICATIONS

This application is a continuation in part of my co-pending U.S. Patent applications Ser. No. 07/309,236 filed Feb. 13, 1989, now U.S. Pat. No. 5,002,69 and Ser. No. 07/360,152 filed Jun. 1, 1989, now U.S. Pat. No. 5,010,113.

BACKGROUND OF THE INVENTION

This invention relates to a process for the production of fire-retardant organic-phosphorus salts which may be in the form of a stable-organic-inorganic emulsions or suspension as produced in U.S. Patent application Ser. No. 07/309,236, filed Feb. 13, 1989 or in a solid form. The flame-retardant organic-phosphorus salts are produced by chemically reacting an organic compound with a phosphorus acid compound to produce an organic-phosphorus acid compound which is then reacted chemically with a basic salt forming compound. The organic-phosphorus acid compound is a surface active compound and will produce an emulsion or suspension when mixed with the basic salt forming compound.

The object of the invention is to produce fire-retardant salts of an organic-phosphorus acid which can be added to plastics to make them fire-retardant. Another object is to provide a method wherein the novel fire-retardant can be produced easily and without danger. Another object is to produce novel fire-retardant plastics.

SUMMARY OF THE INVENTION

While not wishing to be bound by the theory of operation, it appears there is a surface active effect produced when the phosphorus acid compound reacts with the organic compound which assists in distributing the fire-retardant organic phosphorus salt throughout the organic polymer when formed into products which improves the flame-retardant effect of the organic-phosphorus salt. The fire-retardant organic-phosphorus salts are an improvement over the flame-retardant organic-phosphorus compound because they appear to be less toxic and are easier and more economical to produce.

In certain uses of the flame-retardant organic-phosphorus salt of this invention, it is necessary to adjust the pH. This may be accomplished by adding the necessary amount and type of a salt-forming basic compound until an acidic, neutral, or basic pH is obtained. When an excess amount of a liquid flame-retardant organic-phosphorus acid salt is produced, it may be emulsified with an excess amount of powered salt-forming basic compound or filler.

Fire-retardant organic-phosphorus acid salts may be produced by admixing and reacting the following components:
A. organic compound that will react with a phosphorus acid compound, in the amount of 100 parts by weight;
B. acidic salt-forming compound of phosphorus, in the amount of 5 to 100 parts by weight;
C. salt forming basic compound, in the amount of 1 to 200 parts by weight.

The said mixing is carried out in such a way that components A and B are reacted first to produce an organic-phosphorus acid compound, then component C is reacted with the acidic radical of the organic-phosphorus acid. The components may be mixed simultaneously when there is sufficient phosphorus acid to react with both components A and C. The mixing and reacting may be carried out in any manner wherein component B will react with components A and C.

COMPONENT A

Any suitable organic compound that will react chemically with a phosphorus acid compound may be used in this invention. Suitable organic compounds or polymers are, but not limited to, polyols, polyester, polyamides, polyepoxy, alcohols, polyethers, polycarboxyl, phenoplasts, aminoplasts, amines, polyamines, polythioesters, polyacetols, polycarbonates, silicones, vegetable oils, ketone, aldehydes, epoxides, organic acids, cellulose, vinyl polymer, vinyl copolymers, vinyl-diene copolymers, diene polymers, polyimides, polyesteramides, isocyanates, organic borates, and mixtures thereof. Compounds or polymers that contain ionic groups such as:

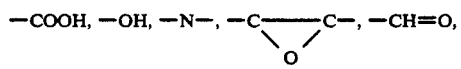

aryl radicals, and any saturated or unsaturated hydrocarbons having tertiary hydrogen may be used in this invention. Liquid organic compounds are preferred, but solid organic compounds and solution of solid compounds may be used. Epoxides are the preferred organic compound.

COMPONENT B

Any suitable acidic salt-forming compound of phosporus may be used in this invention. Suitable acidic salt-forming compounds of phosphorus include, but not limited to, phosphoric acid, phosphinic acid, phosphinous acid, phosphine oxide, phosphorus trichloride, alkylchlorophosphines, organic acid phosphate, phosphorus oxychloride, monoaluminum phosphate, dihydrogen-containing salts of phosphoric acid, hypophosphorous acid, polyphosphoric acid, pyrophosphoric acid, and mixtures thereof. When water is present in the reactive mixture oxides of phosphorus, halides of phosphorus and phosphorus oxyhalides react with the water to form phosphorus acids. Phosphoric acid is the preferred acidic salt-forming compound of phosphorus.

COMPONENT C

Any suitable salt-forming basic compound may be used in this invention. Suitable salt-forming basic compounds include, but not limited to, alkali metal compounds, alkaline earth metal compounds, metal compounds, ammonia compounds, and salt-forming basic organic compounds, and mixtures thereof.

Salt-forming basic compounds which are composed of acids stronger than acidic phosporus compounds are not suitable as a salt-forming basic compound such as salts of sulfuric acid and hydrochloric acids. Basic salts of acids weaker than phosphoric acid may be used.

Suitable alkali metal compounds include compounds which contain sodium, potassium, lithium, rubidium, and cesium. These compounds may be in the form of alkali metal, but are not limited to oxides, hydroxides, carbonates, salts of organic acids, inorganic salts, bicarbonates, natural minerals, silicates, etc., and mixtures thereof.

Suitable akaline earth metal compounds include compounds which contain calcium, strontium, magnesium and barium. These compounds may be in the form of akaline earth metal, but not limited to metals, oxides, hydroxides, carbonates, salts of organic acids, inorganic salts, natural minerals, silicates, etc., and mixtures thereof.

Suitable metal compounds include compounds which contain beryllium, copper, zinc, titanium, zirconium, lead, arsenic, antimony, bismuth, molybdenum, tungsten, manganese, iron, nickel, and boron cobalt. Suitable metal compounds include, but not limited to, metals, oxides, hydroxides, carbonates, salts of organic acids, inorganic salts, natural minerals, silicates, etc., and mixtures thereof.

Suitable ammonium compounds and salt-forming basic organic compounds include, but not limited to, compounds containing ammonium radicals, such as ammonia, amino compounds; e.g., urea, alkylureas, dicyandianide, melamine, quanidine, aminoguanidine; amines; e.g., aliphatic amines, aromatic amines, organic ammonium salts, e.g., ammonium acetate, ammonium oxalate, ammonium carbonate, quaternary ammonium hydroxide, ammonium silicate, and mixtures thereof. Amino compounds are the preferred salt-forming basic compounds.

DETAIL DESCRIPTION

The preferred method to produce fire-retardant organic-phosphorus salts is to chemically react Component A (organic compound) and Component B (acidic salt-forming compound of phosphorus) to produce an organic-phosphorus acid compound then react it with a salt-forming basic compound to produce a flame-retardant organic-phosphorus salt. The chemical reactions of this invention usually take place at ambient temperature and pressure, but in certain reactions between components A and B, then with C, the chemical reaction may be speeded up by increasing the temperature and/or pressure especially when one of the components is in the form of a gas. The chemical reactions between the components may take place within a few minutes or may take 6–12 hours. In some reactions, cooling of the components is necessary.

Components A and B react in an amount wherein there are acidic salt-forming radicals on the organic-phosphorus acidic compound to be reacted with Component C. Some liquid polymerizable polymers, such as polyepoxy compounds, are polymerized by an acid such as phosporic acid so it is necessary to add the acid very slowly and use only a minimal amount.

The moldable or polymerizable plastics which will react with a phosphorus acid compound may be used as Component A. The plastic is first reacted with the phosphorus acid compound then the free acid radicals are reacted with a salt-forming basic compound to produce a fire-retardant plastic which is then molded or polymerized to form a product.

Suitable flame-resistant compounds may be used when desired with the product of this invention such as those which contain halogen, phosphorus or mixtures thereof. Useful flame-resistant compounds are described in Kunststoff-Handbuch, Volume VII, Munich, 1966, pages 110 and 111, which are incorporated herein by reference.

Plastics which do not react with a phosphorus acid compound may be combined with a fire-retardant salt of an organic-phosphorus acid to produce a fire-retardant plastic.

The fire-retardant salt of an organic-phosphorus acid may be added to a plastic when it is in the form of a liquid, emulsion, suspension or in a melted form. About 5% to 100% dry weight of the fire-retardant salt of a phosphorus acid is added to the plastic to make it a fire-retardant product.

Any suitable plastic may be used in this invention. Suitable plastics include but not limited to polyethylene, polypropylene, vinyl polymers, vinyl co-polymers, dienes, vinyl-diene co-polymers, aminoplasts, phenoplasts, polyepoxy, polyester resins, polyamide, polyester, polyimide, polyesteramide, wood cellulose, modified cellulose, rubber, modified rubber, polyaldehydes, polycarbonates, polyurethane, silicones, furan resins, polybutenes, polyvinylidene, and mixtures thereof.

DESCRIPTION OF PREFERRED EMBODIMENTS

My invention will be illustrated in greater detail in the specific examples which follow, which detail the preferred embodiment of my process. It should be understood that the scope of my invention is not limited to the specific processes set out in the examples. Parts and percentages are by weight unless otherwise indicated.

EXAMPLE 1

About 20 parts by weight of a propylene oxide 20 parts by weight of 75% phosphoric acid are slowly mixed then agitated for about 30–40 minutes thereby producing an acidic propylene phosphate with free acid radicals, then 20 parts by weight of urea are admixed and heated while agitated until the urea melts thereby producing a fire-retardant urea salt of propylene phosphate.

EXAMPLE 2

About 40 parts by weight of melamine and 20 parts by weight of 80% phosphoric acid are mixed and agitated for about one hour, then 20 parts by weight of urea are admixed then heated while agitating until the urea melts thereby producing a fire-retardant urea salt of melamine phosphate.

EXAMPLE 3

About 100 parts by weight of a liquid phenol-formaldehyde resin produced with an alkali catalyst and 15 parts by weight of 75% phosphoric acid are added then agitated at ambient temperature for about one hour then 20 parts weight of melamine are added while agitated, the mixture reacts thereby producing a fire-retardant resin, melamine salt of phenol-formaldehyde phosphate.

EXAMPLE 4

80 parts by weight of phenol containing 10% water is mixed with 10 parts by weight of phosphorus oxide while agitating for about one hour the 10 parts by weight of urea are added. The mixture is heated while agitating until the urea melts thereby producing a fire-retardant urea salt of phenol phosphate.

EXAMPLE 5

Example 4 is modified wherein another phosphorus compound is used in place of phosphorus oxide and selected from the group below:
a) phosphorus trichloride
b) phosphoric acid c) polyphosphoric acid
d) pyrophosphoric acid
e) phosphorus oxychloride

EXAMPLE 6

Example 1 is modified wherein another organic compound is used in place of propylene oxide and selected from the list below:
a) glycerine
b) sawdust
c) sucrose polyol (hydroxyl no. 380)
d) polyester polyol
e) propylene glycol
f) liquid polyamide
g) polyepoxy resin (Bisphenol A epoxy resin)
h) polypropylene glycol epoxy resin
i) p-amine phenol epoxy resin
j) maleic anhydride-adipic acid-diethylene, glycol-methyl methacrylate polyester resin
k) poly (furfural) polymer
e) fumaric acid-propylene glycol-styrene polyester resin
m) poly (methyl acrylic acid) resin
n) poly epichlorohydrin
o) poly (acetone-fufural) polymer
p) poly (allyl alcohol) polymer
q) poly (formaldehyde-urea) resin
r) diethylenetriamine fatty acid condensation product
s) poly (formaldehyde-melamine) resin
t) poly (vinylacetate - vinyl alcohol) resin
u) vinyl acetate-ethylene copolymer emulsion
v) poly (methyl methacrylate-acrylic acid) polymer
w) starch
x) sucrose
y) butylene oxide

EXAMPLE 7

Example 1 is modified wherein another basic salt forming compound is used in place of urea and selected from the group below:
a) melamine
b) sodium silicate
c) talc
d) zinc oxide
e) aluminum hydroxide
f) aluminum powder
g) ammonium silicate
h) ammonium borate
i) diethylenetriamine
j) ethylene amine
k) polyamide with free amine radicals
l) aqueous ammonia
m) potassium carbonate
n) antimony oxide
o) magnesium
p) sodium borax
q) urea-formaldehyde resin
r) cyanurdiamide
s) cyanuramide
t) dicyandiamide
u) ammonium acetate
v) ammonium oxalate
w) ammonium carbonate
x) quaternary ammonium hydroxide
y) ethylene amine
z) ammonium polyphosphate

EXAMPLE 8

About 5 parts by weight of polyepoxy resin (Bisphenol A epoxy resin) and 4 parts by weight of 75% phosphoric acid was slowly admixed while agitating for 20-30 minutes, then 5 parts by weight of melamine was added and agitated about 10 minutes, then 15 parts by weight of the polyepoxy resin was admixed, then 5 parts by weight of an amine epoxy catalyst was admixed. The resin solidified and was flame tested after 24 hours. The solid resin was subject to a ½" propane torch flame for about 2 minutes. The superficial layer of the plastic burned and formed a char. The flame did not spread and went out as soon as the torch was removed.

EXAMPLE 9

Example 8 was modified wherein another polyepoxy resin was used in place of and selected from the list below:
a) phenol novalac epoxy resin
b) triphenylol epoxy resin
c) methylene dramiline epoxy resin
d) p-amino phenol epoxy resin
e) dimer acid epoxy resin
f) mixtures thereof

EXAMPLE 10

About 30 parts by weight of a polyvinyl acetate emulsion and 4 parts by weight of phosphoric acid are mixed slowly and agitated for about 30-40 minutes, then 4 parts by weight of melamine is added and thoroughly mixed. The mixture was poured into a polyethylene sheet and allowed to dry for 24 hours. The flame resistant plastic was then tested by placing a ½" propane torch flame on the material for about 2 minutes. A char was produced on the surface and the flame did not spread. The flame went out as soon as the torch was removed.

EXAMPLE 11

Example 10 is modified wherein another resin is used in place of polyvinyl acetate and selected from the list below and gives
a) poly(vinylacetate-ethylene) copolymer
b) poly(vinyl acetate-vinyl alcohol) resin
c) poly(allyl alcohol) resin
d) poly(vinyl chloride-vinyl acetate) emulsion
e) poly(vinyl chloride-acrylonitrile) emulsion
f) Polyvinyl-alcohol emulsion
g) poly(vinyl acetate formaldehyde) emulsion
h) poly(acrylic acid) emulsion
i) poly(methacrylic acid) emulsion
j) poly(methacrylic acid-acrylic acid) emulsion
k) poly(butadiene-styrene) emulsion
l) liquid phenol-formaldehyde resin
m) liquid urea-formaldehyde resin
n) liquid melamine-Formaldehyde resin
o) hydroxyethyl cellulose emulsion
p) starch emulsion
q) poly(butadiene-acrylonitrile) emulsion
r) poly(butadiene-styrene) emulsion
s) polybutadiene resin (hydroxyl No. 466)
t) polybutadiene-styrene resin (hydroxyl No. 365)

EXAMPLE 12

About 100 parts by weight of a meltable plastic selected from the list below and 20 parts by weight of the flame-retardant compound produced in Example 1 are mixed then heated to until the plastic melts and then the flame-retardant compound is thoroughly mixed in the melted plastic. The mixture is poured into a mold wherein the plastic is about one-eight of an inch thick and cooled. The solidified plastic is then tested with a ½" propane torch flame for about 1 minute and on removal of the torch the flame goes out and it does not spread.
a) polystyrene
b) polyethylene
c) polypropylene
d) polyester
e) polyamide
f) polyurethane
g) polyvinyl chloride
h) polymethyl methacrylate
i) polybutylene

EXAMPLE 13

About 20 parts by weight of 30% formaldehyde in water and 10 parts by weight of 75% phosphoric acid are mixed together then 10 parts by weight of urea are added and the mixture reacts to produce fire-retardant urea salt of urea formaldehyde phosphate resin. The resin is mixed with 80 parts by weight of saw dust, then 10 parts by weight of an alkali catalytized urea-formaldehyde syrup are thoroughly mixed then packed into a mold under pressure. The resin hardens to form a sawdust panel.

The sawdust panel was treated with a propane torch with a ½" flame for 2 minutes. The flamed area formed a char and the flame did not spread.

EXAMPLE 14

Example 13 is modified wherein an alkali catalytized phenel-formaldehyde resin syrup is used in place of the alkali catalytized urea-formaldehyde syrup. The sawdust panel is cured under heat and pressure. This panel was tested with a propane torch with a ½" flame for 2 minutes. The flamed area formed a char and the flame did not spread.

EXAMPLE 15

Example 13 is modified wherein melamine is used in place of urea to produce fire-retardant melamine-formaldehyde phosphate resin then utilized in Example 13 in place of the urea-formaldehyde phosphate resin.

EXAMPLE 16

Example 1 is modified wherein a basic salt of a boron compound is used in place of urea and selected from the list below:
a) potassium borate
b) sodium borate
c) ammoniun borate
d) zinc borate
e) urea borate
f) diethylene amine borate
g) ethyl amine borate
h) calcium borate Although specific materials and conditions were set forth in the above examples, these are merely illustrative of preferred embodiments of my invention. Various other compositions, such as the typical materials listed above may be used where suitable. The reactive mixtures and products of my invention may have other agents added hereto enhance or otherwise modify the reaction and products.

Other modifications of my invention will occur to those skilled in the Art upon reading my disclosure. These are intended to be included within the range of my invention as defined in the appended claims.

I claim:

1. A fire retardant plastic comprising a plastic resin composition combined with a slat of an organic-phosphorus acid compound, wherein the said salt is produced by mixing and reacting the following components:
   A) organic compound that will react with a phosphorus acid compound in the amount of 100 parts by weight and selected from the group consisting of polyols, polyester, polyamides, polyepoxy, alcohols, polyethers, polycarboxyl, phenoplasts, aminoplasts, amines, polyamines, polythioesters, polyacetols, polycabonates, silicones, vegetable oils, ketones, aldehydes, epoxides, organic acids, cellulose, vinyl polymers, vinyl co-polymers, vinyl-diene co-polymers, diene polymers, polyimides, polyesteramides, organic borates and mixtures thereof;
   B) acidic salt forming compound of phosphorus in the amount of 5 to 100 parts by weight;
   C) salt forming basic compound in the amount of 1 to 200 parts by weight; the said mixing is carried in such a way that component A and B are reacted first to produce an organic-phosphorus acid compound then component C is reacted with the organic-phosphorus acid compound.

2. The fire retardant plastic of claim 1 wherein the plastic resin composition is combined with 5% to 100% by weight of the salt of an organic-phosphorus acid compound.

3. The fire retardant plastic of claim 1 wherein the acidic salt forming compounds of phosphorus is selected from the group consisting of phosphoric acid, phosphinic acid, phosphinous acid, phosphine oxide, phosphorus trichloride, alkylchlorophosphines, organic acid phosphates, phosphorus oxychloride, monoaluminum phosphate, dihydrogen containing salts of phosphoric acid, hypophosphorus acid, polyphosphoric acid, pyrophosphoric acid and mixtures thereof.

4. The fire retardant plastic of claim 1 wherein the salt forming basic compound is selected from the group consisting of alkali metal compounds, alkaline earth metal compounds, metal compounds, ammonia compounds, compounds containing ammonium radicals, amino compounds, amine and mixtures thereof.

5. The fire retardant plastic of claim 4 wherein the ammonia compound is selected from the group consisting of ammonia, urea, alkylurea, dicyandiamide, melamine, guanidine, aminoguanidine and mixtures thereof.

6. A fire retardant plastic produced by mixing and reacting the following components:
   A. A solid organic plastic that will react with a phosphorus acid compound in the amount of 100 parts by weight;
   B. Acidic salt forming compound of phosphorus in the amount of 5 to 100 parts by weight;
   C. Salt-forming basic compound in the amount of 1 to 200 parts by weight; the said mixture is carried out in such a way that component B reacts with components A and C.

7. A process for the production of a fire-retardant plastic comprising a plastic resin composition combined with a fire retardant salt of an organic phosphorus acid compound, wherein the said salt is produced by mixing and reacting the following components:

A) Organic compound that will react with a phosphorus acid compound in the amount of 100 parts by weight and selected form the group consisting of polyols, polyester, polyamide, polyepoxy, alcohols, polyethers, polycarboxyl, phenophlasts, aminoplasts, amines, polyamines, polythioethers, polyacetols, polycarbonates, silicones, vegetable oils, ketones, aldehydes, epoxides, organic acids, cellulose, vinyl polymers, vinyl co-polymers, vinyl-diene co-polymers, diene polymers, polyimides, polyesteramides, organic borates and mixtures thereof;

B) acidic salt forming compound of phosphorus in the amount of 5 to 100 parts by weight;

C) salt forming basic compound in the amount of 1 to 100 parts by weight; the said mixing is carried out in such a way that components A and B are reacted first to produce an organic-phosphorus acid then component C is reacted with the organic-phosphorus acid compound.

8. A fire retardant plastic comprising a plastic resin composition combined with a salt of an organic-phosphorus acid compound wherein the said salt is produced by mixing and reacting the following components:

A) organic compound that will react with a phosphorus acid compound in the amount of 100 parts by weight;

B) acidic salt-forming compound of phosphorus in the amount of 5 to 100 parts by weight;

C) basic salt of a boron compound; the said mixing is carried out in such a way that component A and B are reacted first to produce an organic phosphorus acid compound then component C is reacted with the organic phosphorus acid compound.

9. A fire retardant plastic comprising a plastic resin composition combined with a salt of an organic phosphorus acid compound, wherein the said salt is produced by mixing and reacting the following components:

A) organic borate compound in the amount of 100 parts by weight;

B) acidic salt forming compound of phosphorus in the amount of 5 to 100 parts by weight;

C) salt forming basic compound in the amount of 1 to 200 parts by weight;

the said mixing is carried out in such a way that component A and B are reacted first to produce an organic phosphorus acid compound then component C is reacted with the organic phosphorus acid compound.

* * * * *

UNITED STATES PATENT AND TRADEMARK OFFICE
CERTIFICATE OF CORRECTION

PATENT NO.  : 5,089,559
DATED       : February 18, 1992
INVENTOR(S) : David H. Blount It is certified that error appears in the above-identified patent and that said Letters Patent is hereby corrected as shown below:

Column 8, line 7, delete "slat" and insert --salt--.

Signed and Sealed this

Fourth Day of May, 1993

Attest:

MICHAEL K. KIRK

Attesting Officer

Acting Commissioner of Patents and Trademarks